United States Patent
Acharya et al.

(10) Patent No.: US 6,236,433 B1
(45) Date of Patent: May 22, 2001

(54) SCALING ALGORITHM FOR EFFICIENT COLOR REPRESENTATION/RECOVERY IN VIDEO

(75) Inventors: Tinku Acharya, Tempe; Werner Metz, Chandler, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/163,022

(22) Filed: Sep. 29, 1998

(51) Int. Cl.[7] ...................................................... H04N 3/14
(52) U.S. Cl. ........................... 348/273; 382/167; 358/525; 358/512
(58) Field of Search ..................................... 348/561, 562, 348/576, 581, 582, 273, 272, 231, 391, 392; 345/127, 129, 130, 150, 152; 358/512, 525, 518, 517, 513–515; 382/162, 166, 298, 299, 167

(56) References Cited

U.S. PATENT DOCUMENTS

| | | | |
|---|---|---|---|
| 5,053,861 | * 10/1991 | Tsai et al. | 348/231 |
| 5,065,229 | * 11/1991 | Tsai et al. | 348/391 |
| 5,418,565 | * 5/1995 | Smith | 348/273 |
| 5,778,106 | * 7/1998 | Juenger et al. | 348/392 |
| 5,914,749 | * 6/1999 | Bwolek et al. | 348/273 |
| 6,046,772 | * 4/2000 | Howell | 348/273 |

* cited by examiner

Primary Examiner—Reinhard J. Eisenzopf
Assistant Examiner—Trang U. Tran
(74) Attorney, Agent, or Firm—Blakely, Sokoloff, Taylor & Zafman LLP

(57) ABSTRACT

What is disclosed is a method comprising defining a scaling region by indicating in a CFA (Color Filter Array) a starting location, and generating a super-pixel which is a downscaled version of the scaling region, the super-pixel fully color interpolated, the downscaling and the color interpolation achieved in an integrated manner.

19 Claims, 6 Drawing Sheets

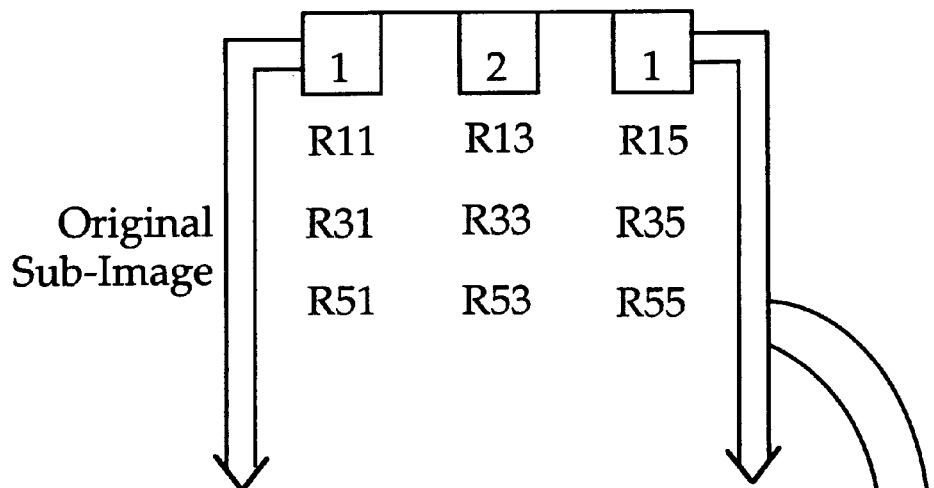
Original Sub-Image
Fig. 3(a)
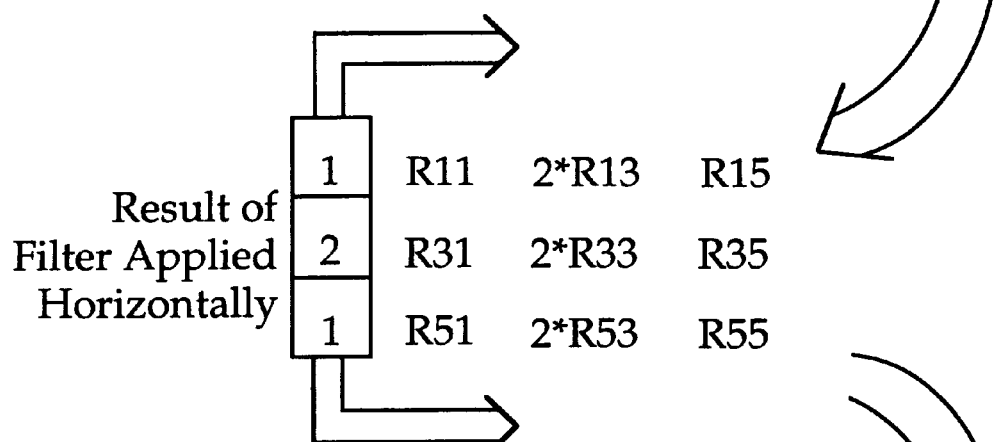
Result of Filter Applied Horizontally
Fig. 3(b)
Result of Filter Applied Vertically to Fig. 3(b)
| 1*R11 | 2*R13 | 1*R15 |
| 2*R31 | 4*R33 | 2*R35 |
| 1*R51 | 2*R53 | 1*R55 |
Fig. 3(c)

| 1*RM,N | 2*RM,N+2 | 1*RM,N+4 |
|---|---|---|
| 2*RM+2,N | 4*RM+2,N+2 | 2*RM+2,N+4 |
| 1*RM+4,N | 2*RM+4,N+2 | 1*RM+4,N+4 |

Fig. 4(a)

| 1*BM+1,N+1 | 2*BM+1,N+3 | 1*BM+1,N+5 |
|---|---|---|
| 2*M+3,N+1 | 4*BM+3,N+3 | 2*BM+3,N+5 |
| 1*M+5,N+1 | 2*BM+5,N+3 | 1*BM+5,N+5 |

Fig. 4(b)

| GM,N+1 | GM,N+3 |
|---|---|
| 2*GM+1,N | 4*GM+1,N+2 |
| 4*GM+2,N+1 | 2*GM+2,N+3 |
| GM+3,N | GM+3,N+2 |

Fig. 4(c)

SCALING ALGORITHM FOR EFFICIENT COLOR REPRESENTATION/RECOVERY IN VIDEO

BACKGROUND OF THE INVENTION

1. Field of the Invention

The invention relates generally to image processing. More specifically, the invention relates to image scaling and color interpolation/recovery.

2. Description of the Related Art

A digital image of a scene/environment has a particular size which is defined by the number of rows and columns of pixels (individual color/intensity points) that it contains. The image size or "resolution" is thus expressed as the number of columns multiplied by the number of rows. For instance, an image with a resolution of 768×576 has 768 columns and 576 rows of pixels for a total of 442,368 pixels.

Often, the original size of an image as captured by an imaging device such as a camera or as later represented is too large for a particular application. While a larger resolution image contains more image information (more pixels per area) and is likely of a more desirable visual quality than a lower resolution image, bandwidth, memory and other constraints may dictate that a lower resolution image be used. For certain devices, such as digital cameras, it may be desirable to reduce its overall cost by utilizing a smaller resolution image so that the required storage component in the device is also smaller. In the context of videoconferencing, for instance, certain standardized image formats such as QCIF (Quarter Common Intermediate Format) have been defined so that receiving and transmitting nodes do not have to be concerned with converting discordant image sizes. In videoconferencing, it is often desirable to maintain a certain "frame" rate (the rate at which individual image frames are received and/or rendered for output). To maintain this frame rate, formats such as QCIF have been defined which are typically smaller than most captured digital image sizes, particularly those captured from certain digital cameras. Since an image may not be originally the same resolution as that desired by a particular application, a process known as image scaling is employed. When an image is scaled "up," its size is increased and when it is scaled "down" its size is reduced. Hereinafter, when referring to "scaling" or "scaled image", down scaling or reduction in image size is the intended meaning and usage of those terms.

The scaling of an image should be distinguished from image cropping, where the resolution is reduced by cutting out a portion of the image. Scaling implies that while the size of the image is reduced, the entire scene/environment in the unscaled image (hereinafter variously referred to as "original" or "unscaled" image) is maintained in great majority. The scene from the original image remains complete but is represented in a lower resolution after scaling.

Image scaling has been achieved in the art in several ways. The most common scaling technique averages pixels in particular image region in equal weighting and then "decimates" or throws away entire pixels in the region, thereby generating a pixel in the scaled image. The averaged pixel replaces an entire region of pixels, with the replaced region not necessarily the same size as the averaging region. For instance, consider a 2:1 scaling procedure where each two by two region of pixels in the original image is to be replaced by a single pixel in the scaled image. When determining the value of the scaled image pixel, it may be desirable to average together a larger region than the 2 by 2 region of replacement, such as a 3 by 3 neighborhood. In such an instance, the "sampling" region (3×3) is said to be larger than the "scaling" region (2×2) and may be useful in ensuring that more of the image is considered so that features that start in the scaling region and bleed over past the scaling region are given the proper consideration. An averaging method where each pixel in the sampling region is given equal weighting however is deficient in several regards. Primarily, the equal averaging of pixels has the effect of losing much of the original image information. Equal weight averaging does little to identify image features, since it treats all parts of the image region identically and then decimates all pixels.

In addition to image scaling, another, typically independent, image processing technique called color interpolation is employed to recover the missing colors in a pixel location generated by an image sensor as explained below. In digital still and video cameras and certain other imaging devices, raw images are first represented as rectangular row and column of pixels with each pixel having the intensity value of a particular color only. In the case of RGB (Red, Green and Blue) sub-sampling imaging devices, images are obtained and stored in a "Bayer" pattern. The Bayer pattern, when three color planes are sub-sampled using a color filter array (CFA), is characterized by including on one row of an image, alternating pixels of Red and Green, and then on a next row, alternating pixels of Blue and Green. For instance, the Bayer pattern for the first four rows of pixels (with each pixel typically an 8-bit value) is as follows (with the rows thereafter repeating the same pattern):

```
GRGRGR . . .
BGBGBG . . .
GRGRGR . . .
BGBGBG . . .
      .
      .
      .
```

As a result, each pixel location contains an intensity value for a single color component only. Assuming, as is the case in some imaging devices, that each pixel of the Bayer pattern has 8 bits of resolution (i.e., the pixel is a value representing the intensity of the color ranging from 0–255), then a "full color" pixel, one having all three R, G and B components would be a 24-bit value. Color interpolation is the recovery of the two missing color components for each pixel color interpolation.

Often, scaling and color interpolation are performed independently and by separate processes. If scaling is performed prior to color interpolation, original sensor information regarding color content will be unknown to the interpolation process yielding a poorer quality image. If, however, where it is known as priori that both scaling and color interpolation are desired for the end image, there is a need for a combined technique that performs both. Further, given the shortcomings of conventional scaling and color interpolation techniques, the combined technique should be designed so as to yield acceptable image quality.

Furthermore, with regard to implementation, if scaling is to be implemented in hardware such as a CMOS (Complementary Metal-Oxide Semiconductor) imaging device, it is important to reduce the computational complexity of the scaling procedure, especially when many other functions must also be carried out by the device. When an imaging device is used to transmit image frames (a sequence of individual still images) for the purpose of videoconferencing, the transmission must be fast enough to maintain the frame rate and be compatible with the bandwidth capability of the interface between the imaging device and the processing device (computer system) that is used to package and transmit the captured image frames to the destination node. In devices that are dual-moded, which may provide both motion and still imaging, there is also desired methods and apparatus that can readily provide different levels of scaling interchangeably.

SUMMARY OF THE INVENTION

What is disclosed is a method comprising defining a scaling region by indicating in a CFA (Color Filter Array) a starting location, and generating a super-pixel which is a downscaled version of the scaling region, the super-pixel fully color interpolated, the downscaling and the color interpolation achieved in an integrated manner.

BRIEF DESCRIPTION OF THE DRAWINGS

The objects, features and advantages of the method and apparatus for the present invention will be apparent from the following description in which:

FIGS. 3(a)–3(c) shows the stages of filter application to obtain the mask for an exemplary Red sub-image CFA region.

FIG. 4(a) shows an exemplary mask applied to attain a Red component in a 4:1 scaled image super-pixel.

FIG. 4(b) shows an exemplary mask applied to attain a Blue component of a super-pixel in a 4:1 scaled image.

FIG. 4(c) shows an exemplary mask applied to attain the Green component of a super-pixel in a 4:1 scaled image.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
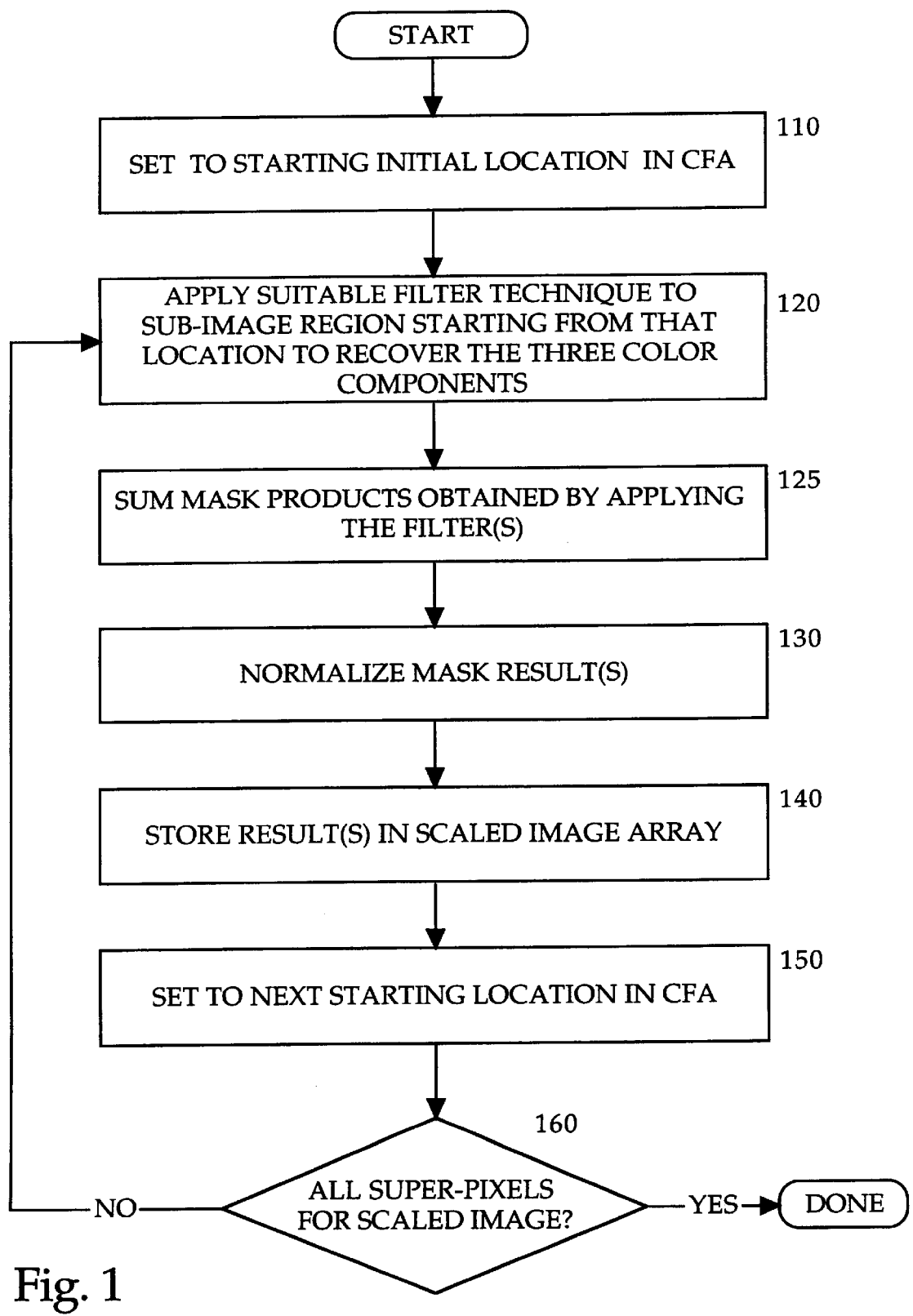
FIG. 1 is a flow diagram of one embodiment of the invention for performing 4:1 scaling.

FIG. 1 is a flow diagram of one embodiment of the invention for performing 4:1 scaling.

The technique described in FIG. 1 is applicable specifically to a image in its CFA (Color Filter Array) form, as derived for instance, from an image sensor or set of image sensors. A common CFA pattern is the Bayer pattern (described below and shown in FIG. 2) which has each pixel location in the array associated with one of three colors, Red (R), Green (G) or Blue (B). Pixels associated with Green appear twice for each Red or Blue associated pixel. Each pixel is associated with only one of three colors (R, G or B) deemed adequate to represent a "full" color pixel, one that contains all three color components, Red, Green and Blue.

According to one embodiment of the invention, first, an initial location in the CFA is set (step 110). This location will determine the starting point for the sampling region and scaling region. For instance, the first starting location for the first 4×4 scaling region is the Red pixel at column 1, row 1 (R11) (see FIG. 2). For 4:1 scaling, a suitable filtering is applied to each sub-image (color plane) region to recover all three R, G and B components for a "super-pixel," a pixel replacing the scaling region of the CFA in the scaled image. Shown and described below with respect to FIG. 3(a) is the matrix ("mask") applied to the Red sub-image beginning at pixel R11 in order to obtain the Red component for the first super-pixel X11. With a three-tap filtering to produce that mask, a total of $3^2$ or 9 pixel locations of the sub-image will be in the sampling region of the resultant mask. The mask products (shown in FIG. 4(a)) are next summed together (step 125) to recover Red component of this 4:1 scaled image super-pixel. The summation may be achieved by running accumulation during the filter application or the products may be stored separately in an array and summed together later. Next, to obtain a single intensity value representative of the Red component of the scaled image pixel, the mask result is normalized (step 130) by dividing the mask result by the total weighting of the mask. In accordance with step 120, filtering is applied to obtain R, G and B components of a super-pixel, by way of the masks shown in FIGS. 4(a), 4(c) and 4(b), respectively. All three components may be determined simultaneously or successively depending on the desired design. In the case of the mask shown in FIG. 4(a), the divisor would thus be 16 (sum of all mask coefficients). The normalized mask result represents a component of the super-pixel in the scaled image associated with the same color as the color of the sub-image. In the case of the initial pixel location, the first such normalized mask result will be a Red component $R_{X}11$ of the scaled image (see FIG. 2) super-pixel X11. This normalized mask result is then stored in an array for the scaled image (step 140). The original CFA pixels cannot yet be completely discarded since some of them will be reused when the next scaled image pixel is determined. The mask (shown in FIG. 4(a)) for the first super-pixel's Red component includes in its sampling region the pixel R15. Since the filter is a three-tap filter, the sampling region for a component in the super-pixel includes the scaling region plus an additional row and column of pixels. The Green and Blue components of the super-pixel are obtained in a similar manner, but based upon the masks shown in FIGS. 4(c) and 4(b), respectively. Once all three components for a super-pixel are thus determined, the technique selects the next starting location in the CFA, which would be the starting location of the next scaling region (step 150). If all of super-pixels in scaled image are compute (step 160), the procedure for integrated scaling and color interpolation is deemed complete. Otherwise, the steps 120–150 repeat for the chosen starting location so that the next super-pixel (components thereof) may be determined.

Figure 2:
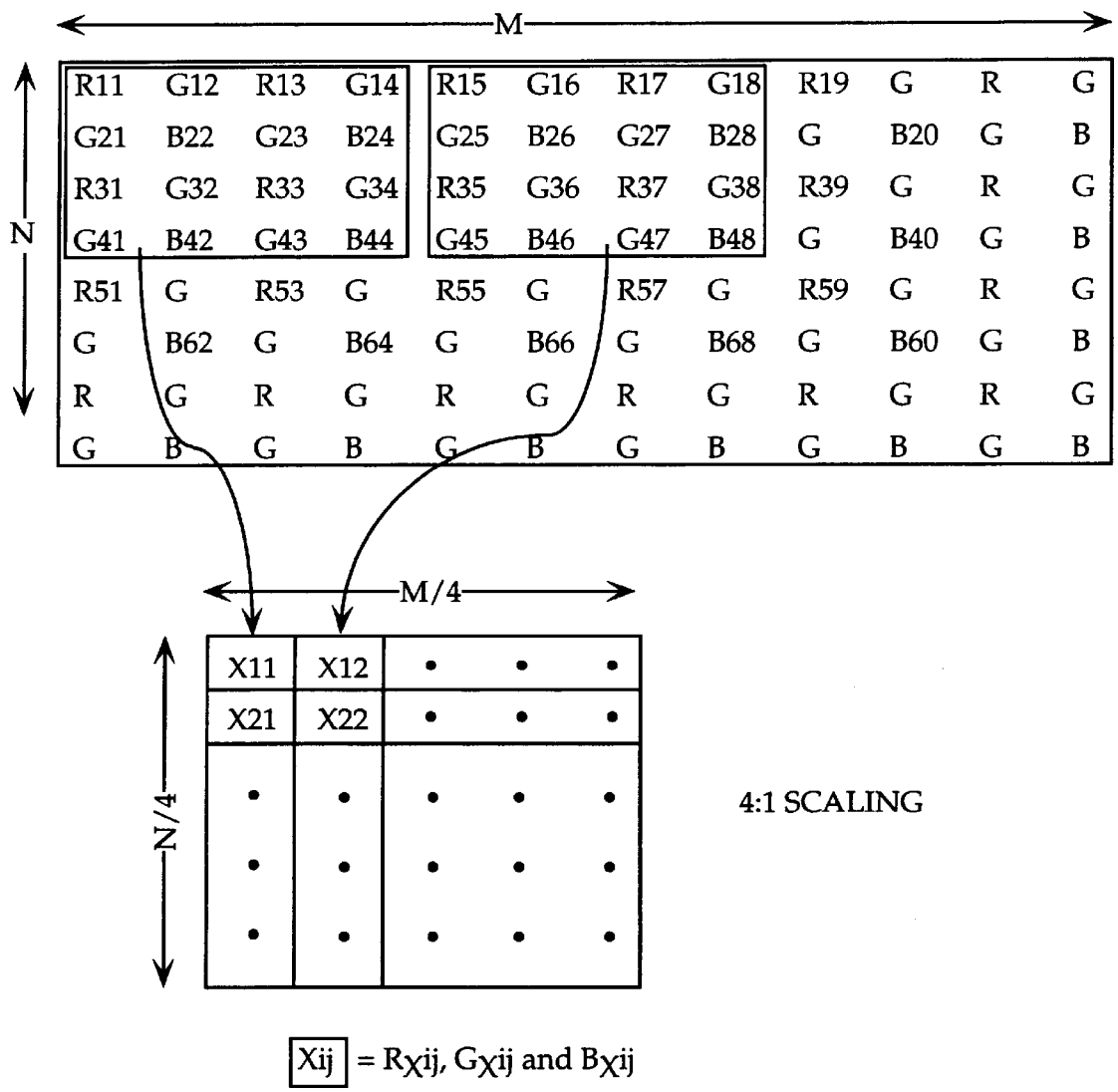
FIG. 2 shows an original CFA region that is scaled according to at least one embodiment of the invention.

FIG. 2 shows an original CFA region that is scaled according to at least one embodiment of the invention.

The CFA shown in FIG. 2 may be viewed as containing three distinct color planes-Red (R), Green (G) and Blue (B). Pixels belonging to or associated with the Red color plane are designated by an "R" prefix, while pixels associated with the Blue color plane are designated by a "B" prefix. The pixels associated with the Green color plane are denoted by a "G" prefix. One characteristic of a Bayer pattern CFA such as that shown in FIG. 2 is that pixels associated with the color planes alternate by row and column. Thus, given a starting pixel location, it is convenient to extract or obtain a sub-image of pixels the same color as the starting location by considering every other column in the same row as the starting pixel location and then after the row has been completed, skipping the next succeeding row and repeating the procedure of the first row with the next, third row. The CFA shown in FIG. 2 is representative of raw image data attainable from an imaging device such as a digital camera or other sensor system.

Conventional scaling techniques do not perform any type of color interpolation. Such techniques were developed with the assumption that the input image is not in Bayer pattern form, but rather, has each pixel containing full RGB color information. An averaging and/or decimation technique that simply throws away original pixels in the scaled image which may be adequate for full-color pixel images would be inadequate for direct application to a CFA image. For instance, a scaling technique using averaging that provides 2:1 scaling down of an image, would replace the value R11 at column 1, row 1 of FIG. 2 with the average of the three neighboring pixels G21, G12 and B22 together with R11. However, such an averaging is inappropriate since each pixel contains different chrominance (color) and luminance (brightness) information. The two Green pixels G21 and G12 primarily contain luminance information while B22 and R11 primarily contain chrominance information. The mixing of the four color planes in such a manner to attain what is essentially a pixel belonging to the scaled image distorts and destroys the Red color information. Likewise, an averaging applied to G or B pixels would result in a mixing together of color plane information which would destroy the information (such as chrominance) contained therein regarding the image. Similarly, a brute-force scaling that merely throws away (decimates) the G21, G12 and B22 pixels completely when scaling would have the effect of destroying even more image information and essentially leave a CFA which cannot be transformed into a full color image by a technique such as color interpolation.

To achieve efficiency and overcome these obstacles for a CFA image, according to one embodiment of the invention, scaling and color interpolation is simultaneously achieved by applying a mark to each color plane sub-image independently and then combining the result into a single super-pixel. The filter can be applied row-wise to the sub-image region and then column-wise as well. When so applied, the filter will form a matrix of coefficients (a mask) by which the intensity values of pixels in the sub-image region are multiplied. The resultant dot product value (i.e., sum of all mask products) is normalized against the weight of the mask as shown in FIG. 1. This normalized value will then represent the value of a color component (R, G or B) of a super-pixel.

A "scaling" region (illustrated in FIG. 2 with solid boundary) for 4:1 scaling consists of a 4 by 4 original CFA region of pixels which are transformed into a scaled image super-pixel in the case of 4:1 scaling or a 4 by 4 CFA region in the case of 2:1 scaling. According to one embodiment of the invention, a mask is applied to each color plane sub-image determine all three components of a scaled image super-pixel. The sampling region, that is the number of pixels transformed by the mask, is larger than the scaling region. For instance, if the 4:1 scaled image super-pixel in Red component $R_X11$ is to be determined, a 3×3 mask is applied to Red pixels R11, R13, R15, R31, R33, R35, R51, R53 and R55. Likewise, the Green component $G_X11$ of the scaled image super-pixel X11 may be determined by applying a 2 by 4 mask to the pixels G12, G14, G21, G23, G32, G34, G41 and G43 in the original CFA. Thus, the sampling region is larger than the scaling region. As described below, this leads to an overlap of the sampling used for two same sub-image pixels in the scaled image which aids in more properly detecting edges features than typical scaling techniques.

In so doing, each scaled image super-pixel Xij has three color components $R_X ij$, $G_X ij$ and $B_X ij$. A 4:1 scaled image consists of super-pixels Xij which each replace a 4-row and 4-column square scaling region in the original CFA. Thus, if the original CFA has a size M by N, a 4:1 scaled image will have a size $$\frac{M}{4} * \frac{M}{4} \text{ or } \frac{M*N}{16}.$$

Advantageously, each of the scaled image super-pixels will also have full color information thus eliminating the necessity of an independently applied color interpolation procedure.

FIGS. 3(a)–3(c) shows the stages of filter application to obtain the mask for an exemplary Red sub-image CFA region.

FIG. 3(a) shows a Red sub-image region in the original CFA. A three-tap filter applied both vertically and horizontally will comprise a mask of 9 products. This sampling region of 9 pixels for the Red color plane sub-image do not appear contiguous and adjacent in the CFA, but rather are offset. The Red sub-image is obtained from the original CFA by skipping every other pixel column and row therein (see FIG. 2).

If a three-tap filter with coefficients of {1,2,1} in accordance with one embodiment of the invention is applied in a horizontal manner (i.e., the filter is applied across a sub-image row) to the original sub-image of FIG. 3(a) the result will be the array (mask) of products shown in FIG. 3(b). If the three-tap filter { 1,2,1} is applied to the result array of FIG. 3(b) now in a vertical manner, the mask of FIG. 3(c) will result. The mask shown in FIG. 3(c) is representative of the mask products that will be summed together to yield a single value which can then be normalized as described above with respect to FIG. 1.

According to the resultant mask the central pixel (such as R33) is given no more than 4 times the weight of the corner pixels within the sub-image region. Referring to FIG. 3(c), it is of note that the non-corner side pixels (in the first and last rows and columns of the region) are ½ the weight of the central pixel which is weighted by 4 as a result of applying the mask. Again, though no prediction can be made as to where the edge feature may lie within this sub-image, no one pixel, which can never fully represent an edge, dominates as it would with the conventional scaling filters. By keeping the correlation between pixels in the sampling region close, there is more of a statistical guarantee that an edge feature will properly represented and not decimated. This is particularly true since edge features that have significant visual impact (i.e., that are clearly visible) will usually pass through a region of at least more than just one or two pixels. As shown in FIG. 4(b), the mask to obtain the Blue component $B_X11$ of the super-pixel X11 is identical in its coefficients to the mask of FIG. 3(c) and thus may be obtained by applying in two directions a three-tap filter {1,2,1).

FIG. 4(a) shows an exemplary mask applied to attain a Red component in a 4:1 scaled image super-pixel.

Referring to back FIG. 3, a three-tap filter described above may be applied first row-wise to the sampled sub-image and then again column-wise to the result of that row-wise application. The intensity value of a component in a scaled image super-pixel is determined by applying such a mask resulting from a filtering operation upon a sub-image sampling region. For convention, M is the row and N, the column number of the starting left-most upper corner pixel of the CFA for a given scaling region. The row and column numbers are separated by commas for ease of understanding. FIG. 4(a) shows the mask needed to determine the Red component of a super-pixel Xij. For instance, referring to FIG. 2, the scaled image super-pixel X11 has a Red component $R_X11$ which is determined by the mask of FIG. 4(a). The mask products shown in FIG. 4(a) are summed together to obtain a single value. Since each pixel in a CFA ordinarily has a set intensity resolution, typically a value of 8-bits (0 to 255), the sum of the mask products must be normalized to such a value. This is achieved by simply dividing the sum of the mask products by the sum of the mask coefficients. Since there is one term with a coefficient of 4, 4 terms have a coefficient of 2 and 4 more with a coefficient of 1, the total "weight" of the mask of FIG. 4(a) (the sum of the coefficients) is 16. Thus, $R_X11$, the Red component of scaled image super-pixel X11 would be [R11+2*R13+R15+ 2*R31+4*R33+2*R35+R51+2*R53+R55]/16 (note that commas separating the row and column numbers are removed in this expression). Likewise, $R_X12$, the Red component of the scaled image super-pixel X12 (see FIG. 2) (whose scaling region has a starting location of R15, such that M=1, N=5), may be obtained by computing the expression: [R15+2*R17+R19+2*R35+4*R37+2*R39+R55+ 2*R57+R59]/16.

The distribution of the mask coefficients across the sampling region shows that the relative coverage or representation in the scaled image between the center pixel and a corner pixel in the sampling region is only four times. This aids in edge detection since no one pixel is given undue weight, and unlike straightforward averaging, functions to better cover the more important areas within a region such as the center.

FIG. 4(b) shows an exemplary mask applied to attain a Blue component of a super-pixel in a 4:1 scaled image.

The mask used to the Blue component Bs in a scaled image super-pixel X is similar to the mask of FIG. 4(a) in that the distribution of coefficients in the mask array is identical. However, the pixels sampled for the masking are entirely different as these pixels represent not a Red sub-image region, but a second Blue sub-image region. The starting pixel of the sampling region for the Blue sub-image region is B22 in the original CFA (see FIG. 2). Starting with this location B12, a three-tap filter may be applied vertically and horizontally to the Blue sub-image such that shown for the Red sub-image in FIGS. 3(a) to 3(c). The resultant mask is shown in FIG. 4(b). As with the Red component $R_X11$, the Blue component may be obtained by summing the mask products and then dividing by the total weighting of the mask (16). Referring back to FIG. 2, the Blue component B of the 4:1 scaled image super-pixel X results from this procedure. Again, considering a starting location (M,N) of the scaling region, the Blue components $B_X11$ (for super-pixel X11) and B12 (for super-pixel X12) have scaling region starting locations M=1, N=1 and M=1, N=5, respectively. These components are computed as:

$B_X11$=[B22+2*B24+B26+2*B42+4*B 44+2*B46+B62+ 2*B64+B66]/16

$B_X12$=[B26+2*B28+B20+2*B46+4*B 48+2*B40+B66× 2*B68+B60]/16, where "0" represents the tenth column of the CFA.

FIG. 4(c) shows an exemplary mask applied to attain the Green component of a super-pixel in a 4:1 scaled image.

As described above, for each scaled image super-pixel Xij, three components a Red component $R_X$ij, a Green component $G_X$ij and Blue component $B_X$ij need to be generated. The invention combines scaling and color interpolation to generate from an MxN CFA a ¼ size full color is often considered as consisting of intensity values for each of three color planes Red, Green and Blue. In the Bayer pattern CFA, the Red and Blue pixels are observable on alternative rows, but the Green pixels are observable on each and every row. Thus, in relation to either Red or Blue, twice as many Green pixels are present. The Green pixels are arranged in a staggered pattern and contain much of the important "luminance" information of the image that is critical for visual distinction of that image. For these reasons, the Green mask shown in FIG. 4(c) varies markedly from the Red and Blue masks of FIGS. 4(a) and 4(b), respectively.

FIG. 4(c) shows that there are only 8 products in the mask to obtain the Green component rather than 9. Also, the coefficients making up the mask products are not symmetric in the mask as they are with FIG. 4(a) and FIG. 4(b). Thus, a filter application in two dimensions such as that shown in FIGS. 3(a)–3(c) would find difficulty in producing the resultant mask in FIG. 4(c). The sum of the mask coefficients remains 16, but the weighting is concentrated in two pixels.

Referring back to FIG. 1, the scaling region for super-pixel X11has two centrally positioned Green pixels in the CFA, which are G23 and G32. All other Green pixels considered within the region are on an edge/corner. Thus, the central Green pixels, which represent the most likely to be essential luminance information in that scaling region, are assigned mask coefficients of 4. Referring to FIG. 4(c), the central Green pixels GM+1, N+2 and GM+2, N+1 are weighted by 4. Thus, the Green component $G_X11$ of the super-pixel X11 may be represented as: [G12+G14+2*G21+ 4*G23+4*G32+2*G34+G41+G43]. Likewise, the Green component $G_X12$ of the super-pixel X12 [G16+G18+ 2*G25+4*G27+4*G36+2*G38+G45+G47]/16.

Further, as noted above FIGS. 4(a) through 4(c) show masks for pixels of an image that is scaled down in size by 4. The quarter-size image scaling is often utilized in motion video applications such as videoconferencing. In other applications where a half-size or 2:1 scaling is needed, the masking procedure described above can be modified as follows. For a 2:1 scaled image every two rows and columns of pixels in the original unscaled CFA will be mapped or reduced to a single scaled image pixel. This case is shown in FIG. 2, where a 2:1 scaled image region is shown to be ½ the size of the scaling region in the original CFA. The size and number of products (i.e., the sampling criteria) may be modified or may be similar to that described above. If a fast hardware implementation of such dual-mode (2:1 and 4:1) scaling is desired, as is often the need for videoconferencing applications, utilizing a separate masking for each may be disadvantageous.

Figure 5:
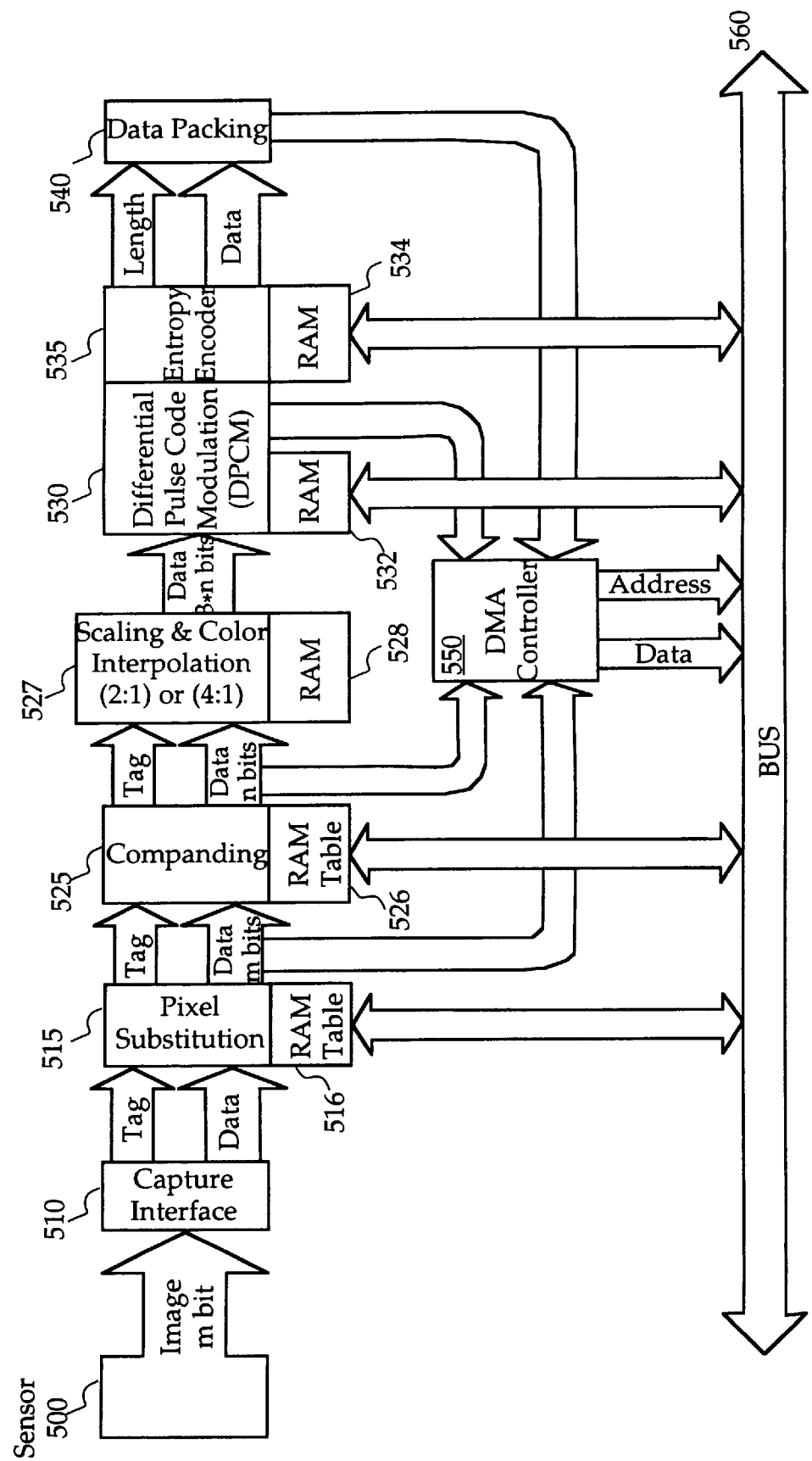
FIG. 5 is a diagram according to an embodiment of the invention.

FIG. 5 is a diagram according to an embodiment of the invention.

FIG. 5 is a block diagram of internal image processing and compression components of an image capture device. A sensor 500 generates pixel components which are intensity values from some source. The m-bit pixel values generated by sensor 500 are sent to a capture interface 510. Sensor 500 in a digital camera context will typically sense either one of R, G, or B components for one "sense" of a location. Thus, the intensity value of each pixel is associated with only one of three color planes/(pixel). Capture interface 510 captures the image generated by the sensor and appends TAGs identifying color association for the individual pixels. The TAGs are two bits each, for example, 00, 01, 10 and 11 for R (Red), G (even-row Green), G (odd-row Green), B (Blue) pixels, respectively. The set of all such pixels for the entire image is the CFA.

It is typical in any sensor device that some of the pixel cells in the sensor plane may not respond to the lighting condition properly. As a result, the pixel values generated from these cell may be defective. These pixels are called "dead pixels." The "pixel substitution" unit 515 replaces each dead pixel by the immediate previously valid pixel in the row.

A RAM table 516 consists of the row and column indices of the dead pixels, which are supplied by the sensor. This RAM table 516 helps to identify the location of dead pixels in relation to the captured image. Companding module 525 is a table look-up based converter to convert each original pixel of m-bit (labeled 10b) intensity captured from the sensor to an n-bit intensity value, where m<n (typically m=10, n=8). A RAM table 526 accompanies companding module 525 and stores the entries of this exemplary sensor companding table. Thus, each pixel in the CFA will be an n-bit value representing one of the three color planes.

After companding, a scaling and color interpolation (SCI) unit 527 is used to scale down the image. If the original image size is M×N, a 2:1 scaling operation scales the image size down to M/2×N/2, while a 4:1 scaling operation scales the image size down to M/4×N/4 but with each scaled image pixel having all three color components. RAM 528 accompanies SCI unit 527 and is used for intermediate storage during the scaling/color interpolation operation.

According to various embodiments of the invention, scaling unit 527 is capable of efficiently simultaneously performing both scaling and color interpolation. As in one embodiment of the invention, the 4:1 scaling is achieved by applying a set of masks to sub-images (selected pixels in a particular color plane), one mask per color sub-image R, G and B. Since the masks are composed of coefficients (multipliers) of 1 and 4, the masks may be implemented by using a shift register which shifts left the intensity value for a given pixel.

In one embodiment of the invention, the mask products are summed together and then normalized to yield the scaled image pixel. The filter design using shift registers and buffers may be accompanied by an adder which adds the products obtained at every column or row into an accumulator. When all 9 (or 8 in the case of Green) products have been accumulated, the output of the accumulator may be passed to another shift register shifting out 4 bits to the right, or in effect, dividing by 16 which is the mask weighting for each of the three masks. Alternatively, as each row or column of pixels is being processed, the products resulting therefrom can be summed together and then normalized. For instance, the outputs of the three-tap filter can be passed to an adder to sum the products together. This sum can then be normalized by the sum of the filter taps, which is 4 (1+2+1). The division by four may be achieved by a shift right of 2 bits (again, using a shift register). Each normalized row or column result can be accumulated and when the filter is applied completely to the sampling region, the accumulated value may again be divided by normalized.

The original CFA may be scaled by a factor of 2 rather than 4 by SCI with 627. One skilled in the art will readily be able to modify the methodology described above to implement a 2:1 or N:1. With above implemented, scaled image data can more rapidly be generated and sent to the other image processing units shown in FIG. 6 and ultimately, will speed the delivery of image data over bus 560 and out of the image capture device. This is especially advantageous for the 4:1 scaling operation, which is used in videoconferencing where (frame rate maintenance) is important. The quality of the scaled image is also improved over traditional 4:1 scaling in that effective color interpolation is also simultaneously performed yielding scaled image data that is of full color. If the CFA has each pixel of n-bits, then each super-pixel in the scaled image will have 3*n bits associated with it, n bits for each color component. These color component values may be concatenated or transmitted separately as is desired. The scaled image data, obtained super-pixel by super-pixel may be passed to a compression unit 530 and on encoder 535 which compacts and encodes the scaled image data into manageable and transportable blocks. The compressed and encoded data is then packed together by a data packing unit 540 and then out to DMA controller 550 for transfer across BUS 560. Bus technology, addressing protocols and DMA controllers are well-known in the art of system design and can be readily modified/specialized to fit the desired application.

Each of the RAM tables 516, 526, 528, 532 and 534 can directly communicate with bus 560 so that their data can be loaded and then later, if desired, modified. Further, those RAM tables and other RAM tables may be used to store scaled image data as needed. Though the individual components (selectors, shifters, registers, and control address signals) of scaling unit 527 have not been detailed, one skilled in the art will readily be able to implement such a scaling device. The efficiency and ease of simultaneous and color interpolation yields the advantage of producing high quality, scaled down color image which will have edge features preserved in a better manner than with conventional scaling only techniques. Though the invention is described for an R, G and B CFA, it can be applied to any of the numerous CFA scheme such as MWY (Magenta, White and Yellow).

Figure 6:
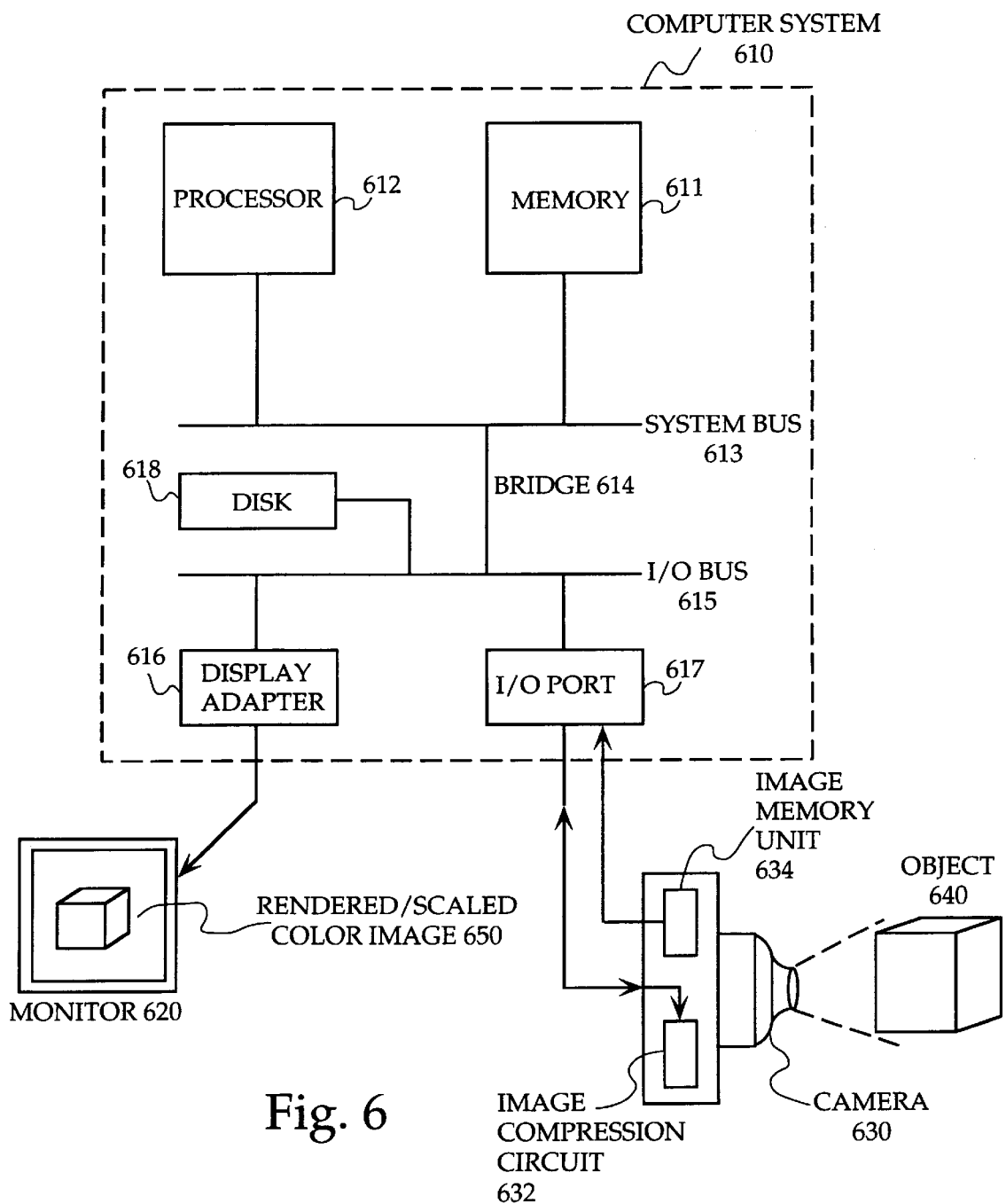
FIG. 6 is a system diagram of one embodiment of the invention.

FIG. 6 is a system diagram of one embodiment of the invention.

Illustrated is a computer system 610, which may be any general or special purpose computing or data processing machine such as a PC (personal computer), coupled to a camera 630. Camera 630 may be a digital camera, digital video camera, or any image capture device or imaging system, or combination thereof and is utilized to capture a sensor image of an scene 640. Essentially, captured images are processed by an image processing circuit 632 so that they can be efficiently stored in an image memory unit 634, which may be a ROM, RAM or other storage device such as a fixed disk. The image contained within image memory unit 634 that is destined for computer system 610 is enhanced in that the loss of image features due to conventional scaling and independent color interpolation is greatly mitigated by better preserving edge features. In most digital cameras that can perform still imaging, images are stored first and downloaded later. This allows the camera 630 to capture the next object/scene quickly without additional delay. However, in the case of digital video camera, especially one used for live videoconferencing, it is important that images not only be quickly captured, but quickly processed and transmitted out of camera 630. The invention in various embodiments is well-suited to providing fast throughput of color image data to other parts of the image processing circuit 632 so that the overall speed of transmitting image frames is increased over typical scaling techniques which do not color interpolate by their very nature.

Image scaling and color interpolation is carried out within the image processing circuit 632 in this embodiment of the invention. After the image is scaled/interpolated, it may also be compressed for transport. The decompression of the transmitted image data may be achieved using a processor 612 such as the Pentium® (a product of Intel Corporation) and a memory 611, such as RAM, which is used to store/load instruction addresses and result data. In an alternative embodiment, scaling/color interpolation may be achieved in software application running on computer system 610 rather than directly in hardware. The application(s) used to generate scaled image super-pixels after download from camera 630 may be an executable compiled from source code written in a language such as C++. The instructions of that executable file, which correspond with instructions necessary to scale the image, may be stored to a disk 618 or memory 611. It would be readily apparent to one of ordinary skill in the art to program a computing machine to scale and simultaneously color interpolate an image in accordance with the methodology described above. Further, the various embodiments of the invention may be implemented onto a video display adapter or graphics processing unit that provides scaling and color interpolation.

Computer system 610 has a system bus 613 which facilitates information transfer to/from the processor 612 and memory 611 and a bridge 614 which couples to an I/O bus 615. I/O bus 615 connects various I/O devices such as a display adapter 616, disk 618 and an I/O port 617, such as a serial port. Many such combinations of I/O devices, buses and bridges can be utilized with the invention and the combination shown is merely illustrative of one such possible combination.

When an image, such as an image of a scene 640, is captured by camera 630, they are sent to the image processing circuit 632. Image processing circuit 632 consists of ICs and other components which execute, among other functions, the scaling down and simultaneous color interpolation of the captured image. The scaling/interpolation technique discussed herein, may utilize image memory unit to store the original CFA of the scene 640 captured by the camera 630. Further, this same memory unit can be used to store the scaled/interpolated image data. Once all pixels are scaled, processed and transferred to the computer system 610 for rendering, the camera 630 is free to capture the next image. The nature of the scaling technique in color interpolating allows for camera 630 to act as a motion camera that is color rather than gray scale even though it is not more complex than a pure gray scale type camera. When the user or application desires/requests a download of images, the scaled compressed images stored in the image memory unit are transferred from image memory unit 634 to the I/O port 617. I/O port 617 uses the bus-bridge hierarchy shown (I/O bus 615 to bridge 614 to system bus 613) to temporarily store the scaled and compressed image data into memory 611 or, optionally, disk 618.

The compressed images are decompressed on computer system 612 by suitable application software (or hardware), which may utilize processor 612 for its execution. The image data may then be rendered visually using a display adapter 616 into a rendered/scaled color image 650. The scaled color image is shown as being smaller in size than the original captured scene. This is desirable in many image applications where the original sensor capture size of a scene is not needed. In a videoconferencing application, the image data in its compressed and scaled form may be communicated over a network or communication system to another node or computer system in addition to or exclusive of computer system 610 so that a videoconferencing session may take place. Since scaling and color interpolation are already achieved on-camera in one embodiment of the invention, it may be possible to implement a co-mmunication port in camera 630 that allows the image data to be transported directly to the other node(s) in a videoconferencing session. Wherever a user of computer system 610 also desires to see his own scene on monitor 620, image data that is scaled and color interpolated may be sent both to computer system 610 and transported over a network to other nodes. Further, the various embodiments of the invention allow also for efficient software scaling to be implemented if desired. As discussed earlier, the scaled/interpolated color image will have more visually accurate edge features than typical in scaling operations due to the enhancement in the scaling process and the simultaneous nature of the color interpolation which is in effect an embedded process. The end result will be a higher quality rendered scaled image 650 that displayed onto monitor 620 or other nodes in a videoconferencing session as compared with even typical scaling methods which do not color interpolate, but leave that task to another device/process or stage of the imaging session.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:
defining a scaling region in a CFA (Color Filter Array) image; and
generating a super-pixel which is a downscaled version of said scaling region, said super-pixel being fully color interpolated, by applying a mask to a sub-image region of the CFA image, said sub-image region having pixels of all the same color plane and normalizing the result of applying said mask to form a color component of said super-pixel, said color component having the color associated with the sub-image region.

2. A method according to claim 1 wherein said CFA has each pixel associated with only one of three color planes.

3. A method according to claim 2 wherein said color planes are Red, Green and Blue.

4. A method according to claim 2 wherein said CFA is arranged in a Bayer pattern.

5. A method according to claim 1 wherein said down scaling is 4 to 1 down scaling.

6. A method according to claim 3 wherein full color interpolation for each super-pixel denotes that each super-pixel has components for all three said Red, Green and Blue color planes.

7. A method according to claim 1 wherein said mask is configured to favor a central portion of said sub-image region while maintaining the ability to represent edge features occurring elsewhere than said central portion.

8. A method according to claim 2 wherein said color planes are Magenta, White and Yellow.

9. An apparatus comprising:
a scaling and color interpolation unit configured to transform CFA (Color Filter Array) pixels, each associated with only one of multiple color components, into downscaled super-pixels, each super-pixel having all of said color components, by applying a mask to a sub-image region of the CFA pixels, said sub-image region having pixels of all the same color plane and normalizing the result of applying said mask to form a color component of a super-pixel, said color component having the color associated with the sub-image region.

10. An apparatus according to claim 9 comprising:

a memory coupled to said scaling and color interpolation unit, configured to store said super-pixel data.

11. An apparatus according to claim 9 comprising:

an image sensor coupled to said scaling and color interpolation unit, said sensor providing in a Bayer pattern data for said CFA.

12. An apparatus according to claim 9 wherein said scaling and color interpolation unit is incorporated into an imaging device.

13. An apparatus according to claim 12 wherein said imaging device is a digital camera.

14. An article of manufacture comprising a computer readable medium having instructions stored thereon which when executed by a processor cause:

a scaling region to be defined in a CFA (Color Filter Array) image; and a super-pixel which is a downscaled version of said scaling region to be generated, said super-pixel being fully color interpolated, by applying a mask to a sub-image region of the CFA image, said sub-image region having pixels of all the same color plane and normalizing the result of applying said mask to form a color component of said super-pixel, said color component having the color associated with the sub-image region.

15. The article of manufacture of claim 14 wherein said CFA image has each pixel therein associated with only one of three color planes.

16. The article of manufacture of claim 15 wherein said color planes are Red, Green and Blue.

17. The article of manufacture of claim 16 wherein said CFA image is arranged in a Bayer pattern.

18. The article of manufacture of claim 17 wherein full color interpolation for each super-pixel denotes that each super-pixel has components for all three of said Red, Green, and Blue color planes.

19. The article of manufacture of claim 14 wherein the medium includes further instructions which when executed by the processor cause said mask to be configured to favor a central portion of said sub-image region while maintaining the ability to represent edge features occurring elsewhere than said central portion.

* * * * *

UNITED STATES PATENT AND TRADEMARK OFFICE
CERTIFICATE OF CORRECTION

PATENT NO. : 6,236,433 B1
DATED : May 22, 2001
INVENTOR(S) : Acharya et al.

It is certified that error appears in the above-identified patent and that said Letters Patent is hereby corrected as shown below:

Column 7,
Line 8, delete "comer" and insert -- corner --.
Line 63, delete "B 44" and insert -- B44 --.
Line 64, delete "B 48" and insert -- B48 --.
Line 64, delete "B66x2*B68" and insert -- B66+2*B68 --.

Column 12,
Line 7, delete "co-mmunication" and insert -- communication --.

Signed and Sealed this

Twenty-first Day of May, 2002

Attest:

Attesting Officer

JAMES E. ROGAN
Director of the United States Patent and Trademark Office